Figure 13:
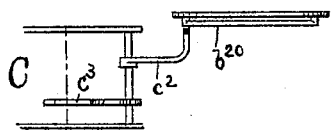

(No Model.) 8 Sheets—Sheet 1.
W. D. WATSON & T. HUMPHREYS.
APPARATUS FOR SUPPLYING OR MEASURING CURRENTS OF ELECTRICITY.
No. 605,765. Patented June 14, 1898.
Fig. 1.
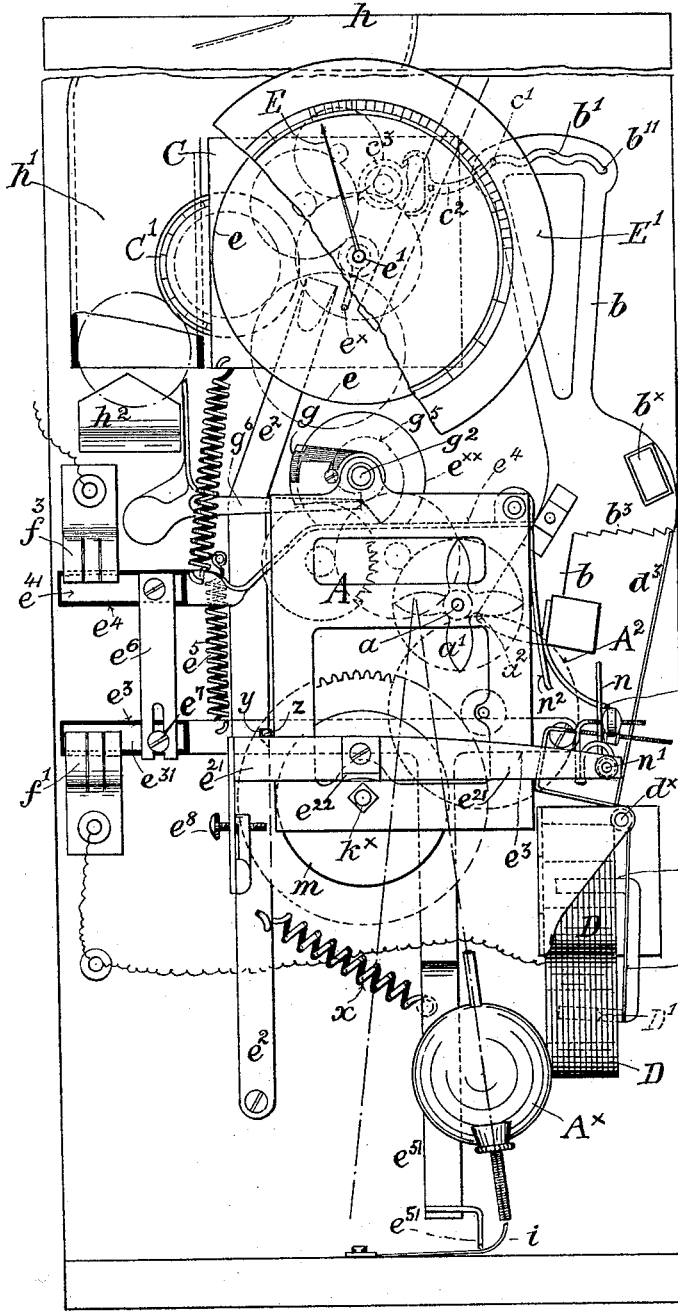
Fig. 1ᵇ
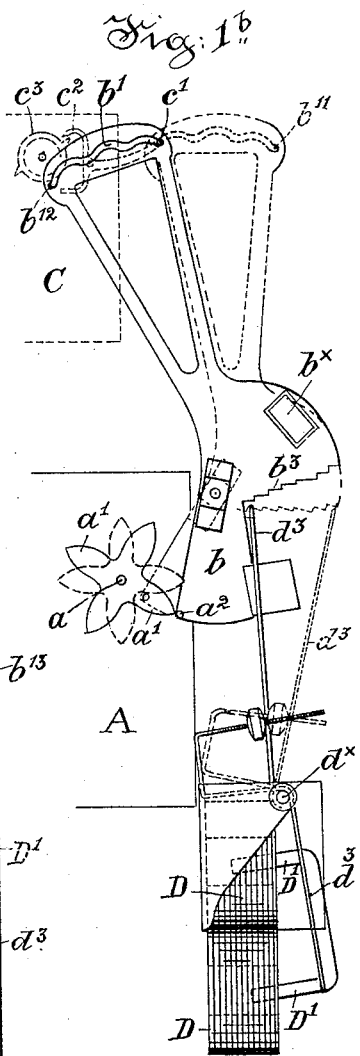
WITNESSES:
F. W. Wright
S. C. Connor
INVENTORS
Wᵐ D. Watson & Thomas Humphreys
by their Attorneys
Howson and Howson (No Model.) 8 Sheets—Sheet 2.
W. D. WATSON & T. HUMPHREYS.
APPARATUS FOR SUPPLYING OR MEASURING CURRENTS OF ELECTRICITY.
No. 605,765. Patented June 14, 1898.
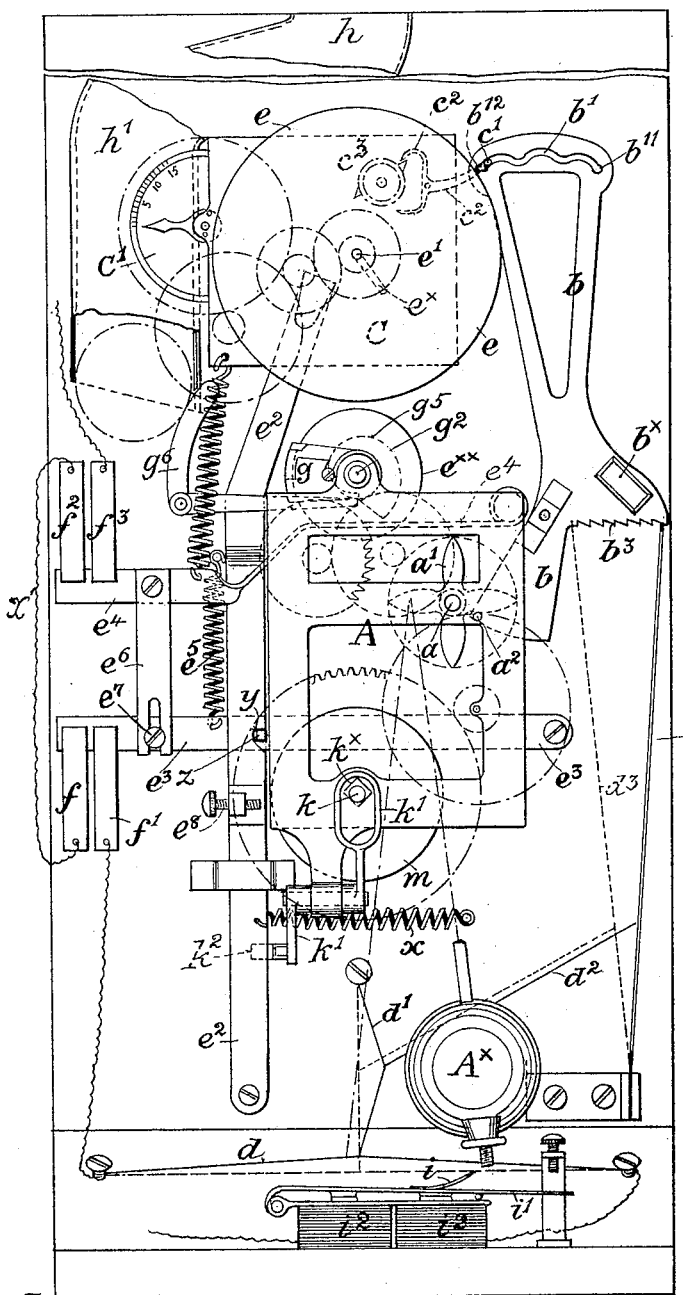
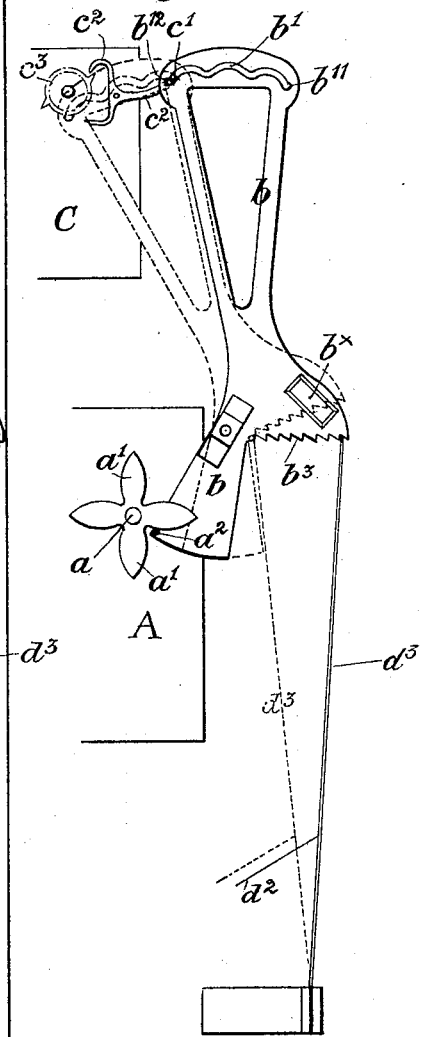
WITNESSES
INVENTORS
W<sup>m</sup> D. Watson & Thomas Humphreys
by their attorneys
Howson and Howson (No Model.) 8 Sheets—Sheet 3.
W. D. WATSON & T. HUMPHREYS.
APPARATUS FOR SUPPLYING OR MEASURING CURRENTS OF ELECTRICITY.
No. 605,765. Patented June 14, 1898.
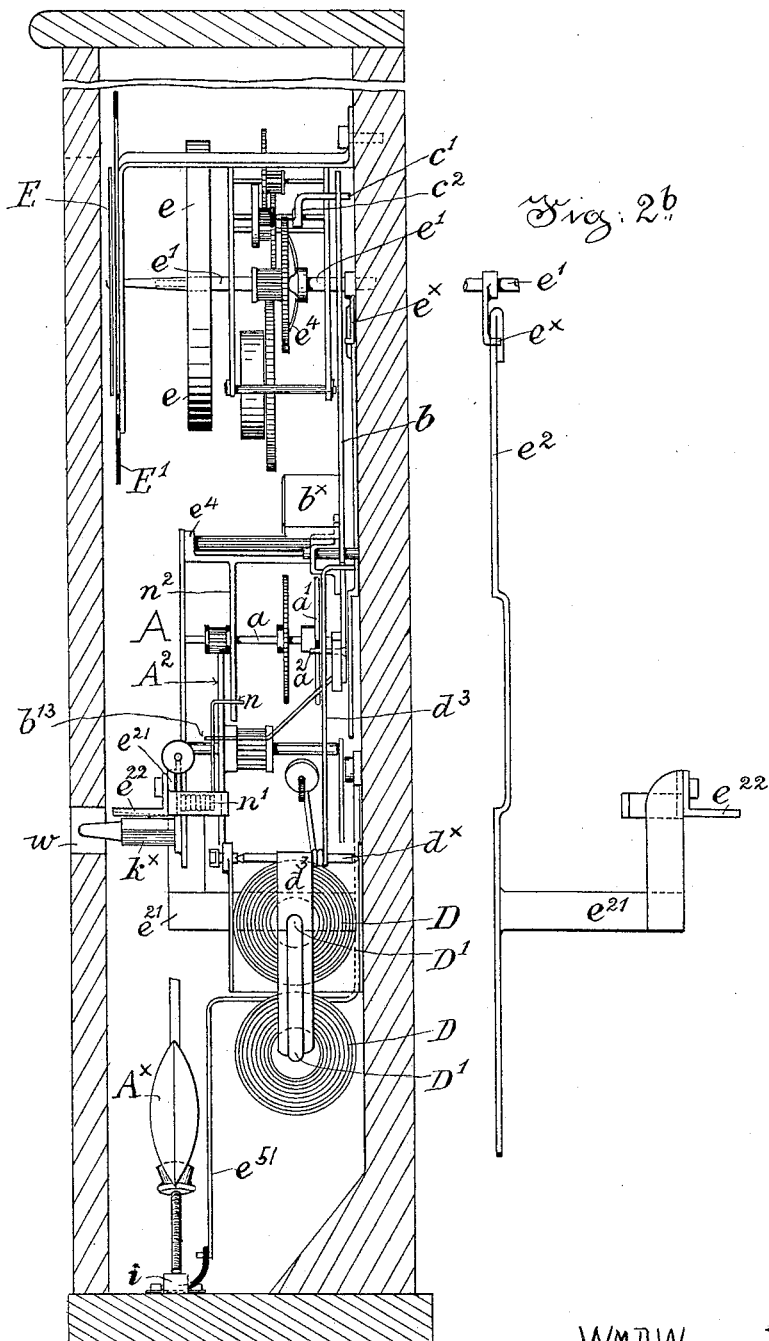
WITNESSES:
F. W. Wright.
S. C. Connor.
INVENTORS
Wm. D. Watson & Thomas Humphreys
BY Howson and Howson
THEIR ATTORNEYS (No Model.) 8 Sheets—Sheet 4.
W. D. WATSON & T. HUMPHREYS.
APPARATUS FOR SUPPLYING OR MEASURING CURRENTS OF ELECTRICITY.
No. 605,765. Patented June 14, 1898.
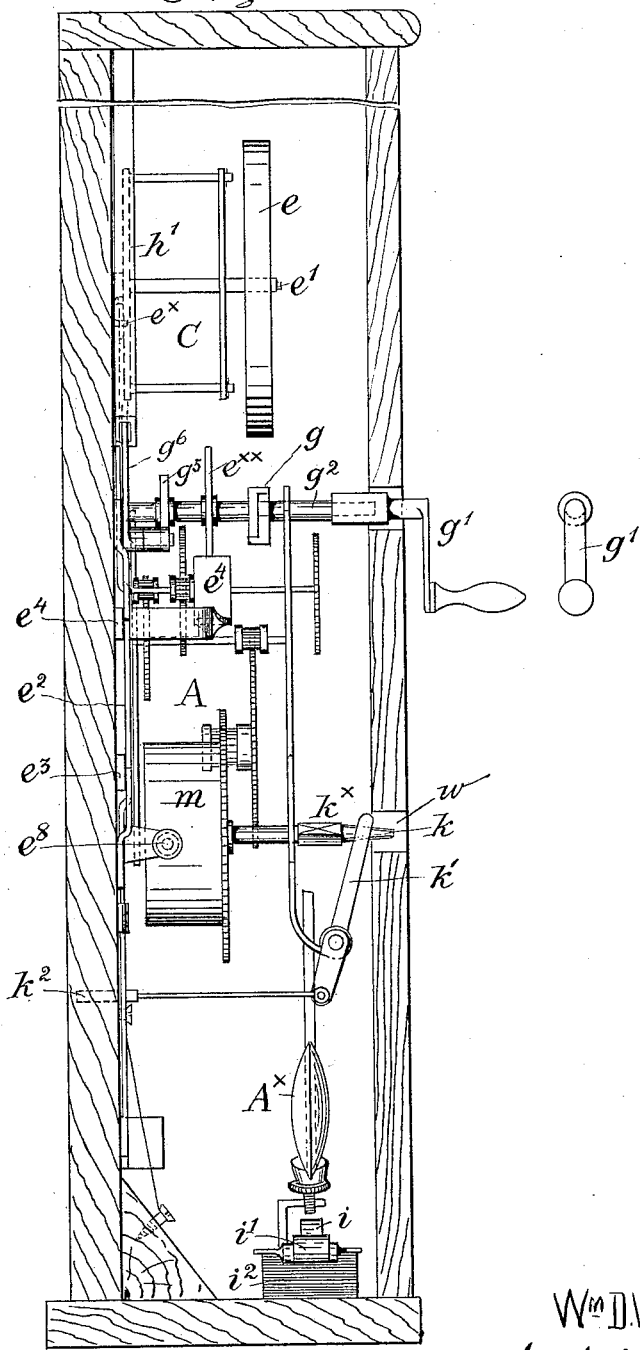
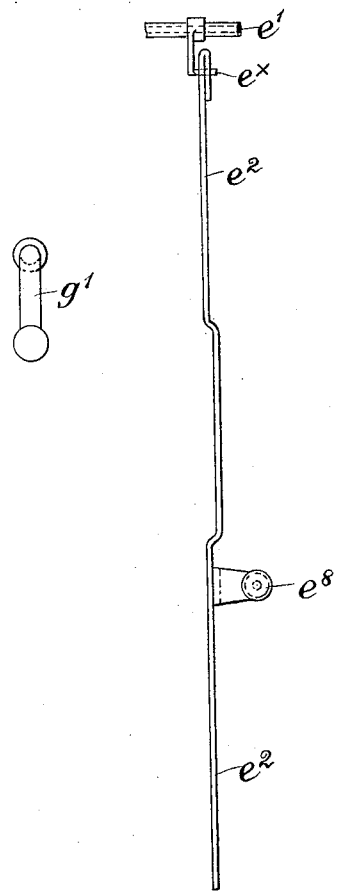
WITNESSES:
R. W. Wright
S. C. Connor
INVENTORS
Wm. D. Watson & Thomas Humphreys
by their attorneys
Howson and Howson

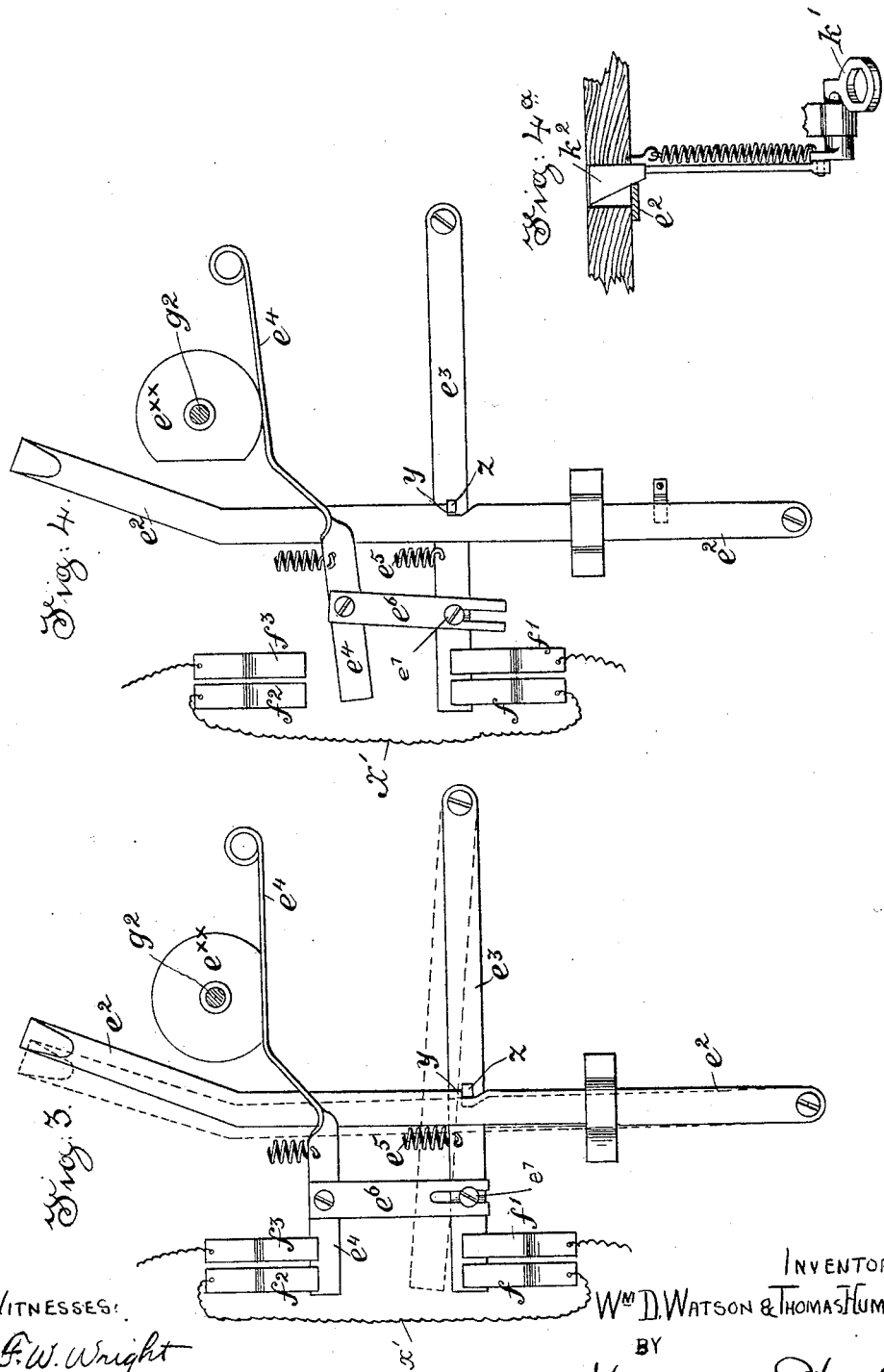

(No Model.) 8 Sheets—Sheet 6.
W. D. WATSON & T. HUMPHREYS.
APPARATUS FOR SUPPLYING OR MEASURING CURRENTS OF ELECTRICITY.
No. 605,765. Patented June 14, 1898.
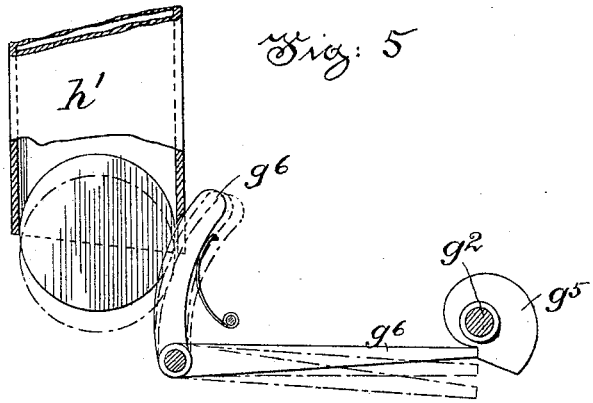
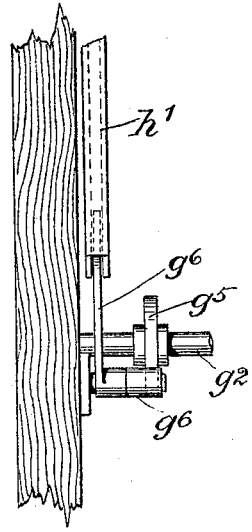
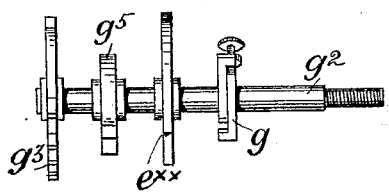
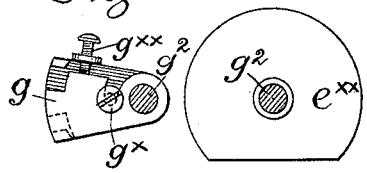
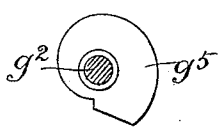
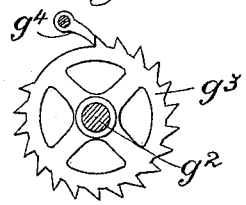
Witnesses:
F. W. Wright
I. C. Connor
Inventors
Wm. D. Watson & Thomas Humphreys
By Howson and Howson
Their Attorneys.

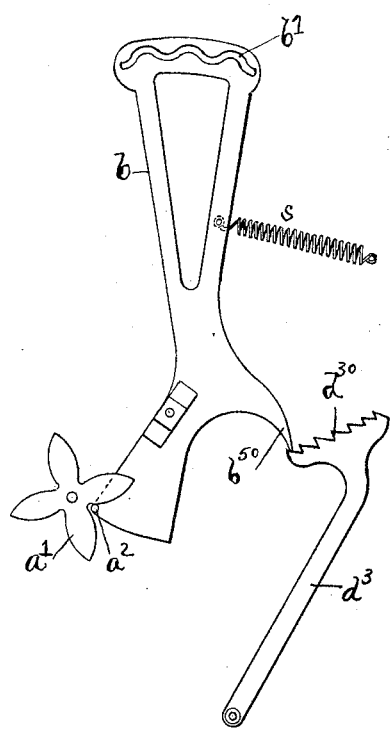

(No Model.) 8 Sheets—Sheet 8.

W. D. WATSON & T. HUMPHREYS.
APPARATUS FOR SUPPLYING OR MEASURING CURRENTS OF ELECTRICITY.

No. 605,765. Patented June 14, 1898.

WITNESSES:
P.W. Wright
M.H. Miller

INVENTORS
W.D. WATSON & T. HUMPHREYS
BY
Howson and Howson
THEIR ATTORNEYS.

UNITED STATES PATENT OFFICE.

WILLIAM D. WATSON AND THOMAS HUMPHREYS, OF ROCHDALE, ENGLAND; SAID HUMPHREYS ASSIGNOR TO SAID WATSON.

APPARATUS FOR SUPPLYING OR MEASURING CURRENTS OF ELECTRICITY.

SPECIFICATION forming part of Letters Patent No. 605,765, dated June 14, 1898.

Application filed December 28, 1897. Serial No. 663,972. (No model.)

*To all whom it may concern:*

Be it known that we, WILLIAM DOBSON WATSON and THOMAS HUMPHREYS, subjects of the Queen of Great Britain, both residing at Rochdale, in the county of Lancaster, England, have invented new and useful Improved Apparatus for Supplying or Measuring Currents of Electricity, of which the following is a specification.

This invention relates to the construction of apparatus for supplying a definite amount of electricity, the construction being adapted to be used as a prepayment-meter or otherwise, and especially to such apparatus as are required to supply the said current in varying quantity—say for varying numbers of lamps to be lighted at the same time or for other purposes; and our improvements are applicable to that class of apparatus wherein the current is measured by clockwork according to the time taken for a given current to flow through the meter. It will be understood that it is not possible to employ ordinary simple clockwork for this purpose, as such clockwork always works at a constant speed and will therefore not allow for varying amounts of electricity flowing through the meter.

This invention therefore consists principally of a primary clockwork-motion—such as that of a pendulum-clock, for example—provided with means for working a governing-lever controlling the escapement of an auxiliary clockwork-motion which actuates a "cut-out" device and, if required, an indicator, the said governing-lever being so combined with an ampere-meter or its equivalent as to remain inactive when no current is being used and to allow the aforesaid escapement to work slowly or quickly, according as a greater or less amount of current is being used.

Figure 14:
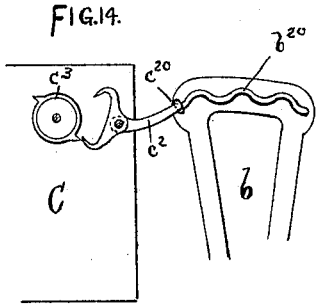
Figure 15:
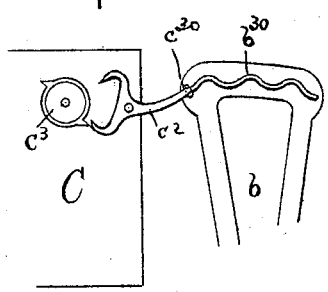
Figure 16:
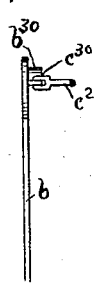
Figure 17:
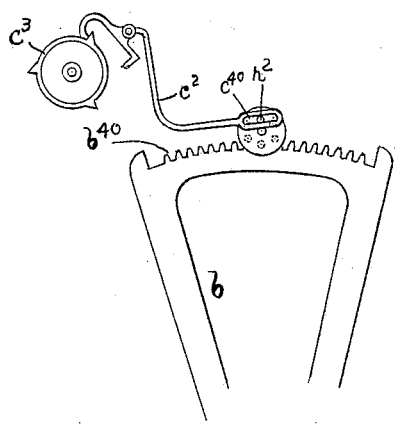
Figure 18:
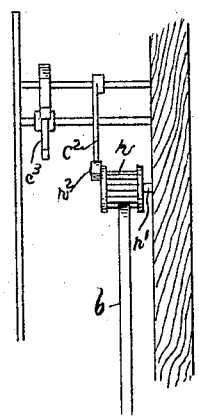

Figure 1 on the annexed drawings is a face view of apparatus constructed according to our invention for a meter for six electric lamps. Fig. 1$^a$ shows a detached part of Fig. 1$^\times$. Fig. 1$^b$ shows a detached part of Fig. 1, hereinafter referred to, and illustrates the principle of our invention. Fig. 1$^\times$ is a view similar to Fig. 1, showing a modification. Fig. 2 is a side elevation of Fig. 1. Fig. 2$^a$ shows a detached part of Fig. 2$^\times$. Fig. 2$^b$ shows a side elevation of the long switch-lever hereinafter described. Fig. 2$^\times$ shows a view similar to Fig. 2 of the modified form of the apparatus shown in Fig. 1$^\times$. Figs. 3 and 4 are detached views, enlarged, showing the switch-levers. Fig. 4$^a$ is a view of a detail hereinafter referred to. Figs. 5 to 11 are views of detached parts relating to the auxiliary clockwork and hereinafter referred to. Fig. 12 is a view of a modified form of governing-lever and certain parts operating therewith. Fig. 13 is a plan, and Fig. 14 a side elevation, of a modification of a detail shown in Figs. 1 to 2$^\times$. Fig. 15 is a side elevation, and Fig. 16 an edge view, of another modification of the same detail; and Figs. 17 and 18 are views similar to Figs. 15 and 16 of still another modification of the same detail.

In the first place we make use of any suitable and ordinary clock-motion, (indicated generally at A on the drawings, Figs. 1, 1$^\times$, 2, and 2$^\times$. (The drawings show for this clockwork the works of a common well-known pendulum-clock, and such works therefore require no further description, and upon any convenient and suitable arbor or shaft of this clockwork—say the arbor $a$, as shown—we fix a cam $a'$ of such form that as the said arbor $a$ revolves the cam $a'$ will move the bowl or pin $a^2$ on one end of the governing lever $b$, before mentioned, which is by preference cranked and provided with a suitable weight $b^\times$, as shown in Figs. 1 to 1$^\times$, or a spring $s$, as shown in Fig. 12, to cause it, when allowed to do so, to rest in contact with the entire surface of the said cam $a'$. The other end of this governing-lever $b$ is formed or provided with a cam-surface, such as a slot $b'$, of zigzag or similar form, Figs. 1 to 1$^\times$, to move a pin $c'$ upon the escapement-lever $c^2$ of the auxiliary clockwork before named, (indicated generally at C on the drawings.) Instead of the slot $b'$ and pin $c'$ a wire $b^{20}$ and clip $c^{20}$, Figs. 13 and 14, or a flange $b^{30}$ and clip $c^{30}$, Figs. 15 and 16, may be used to move the escapement-lever $c^2$ back and forth by the movement of the governing-lever $b$, or, as shown in Figs. 17 and 18, the upper edge of the lever $b$ may be formed with teeth $b^{40}$, engaging a pinion $r$ on center pin $r'$, supported in the framework, the said pinion carrying a crank-pin $r^2$, working in a slot $c^{40}$ at one end of lever $c^2$. As the pinion is rotated by the movement of lever $b$ crank-pin $r^2$ moves the lever $c^2$ of the clockwork C. This clockwork C may be the works of a common clock of any suitable description having an escapement-wheel $c^3$ with the desired number of teeth on it to cause the shaft $e'$ thereof, which is driven by friction-gearing, as usual in many common clocks, to revolve at the requisite speed. Such gearing therefore requires no further description. Each incline or slope of the zigzag slot $b'$ (or its equivalent) works the pin $c'$ in one direction or the other and so actuates the escapement-wheel $c^3$ and allows one tooth to escape, and therefore (according to the extent of motion imparted by the cam $a'$ to the governing-lever $b$, as hereinafter described) this escapement is repeated one or more times as required by the meter, the full stroke of the governing-lever $b$, as hereinafter explained, causing the maximum motion of the auxiliary clockwork C to correspond with the time taken by the flow of the full amount of current for which the meter is adapted—for example, in order to light the whole of a number of lamps (say six, as illustrated) to be supplied by the meter.

In order to regulate the extent of the stroke of the governing-lever according to the time taken by the flow of the amount of current being used or to stop the action of the said lever in case no current is being used, we provide the said governing-lever $b$ with a graduated stepped cam-surface $b^3$ and we fit to the apparatus an ampere-meter or its equivalent, which is formed or provided with a projection or arm $d^3$ in such a position with regard to the last-named cam-surface $b^3$ that as the position of the said arm $d^3$ changes according to the amount of current being used (the ampere-meter or its equivalent being in the circuit thereof) or according to the stoppage of such current the bowl or pin $a^2$ on the end of the governing-lever $b$ can be held partly or almost out of reach of the cam $a'$, (worked by the clockwork A, first named,) and consequently the action of the escapement $c^2$ $c^3$ will be repeated more or less frequently or will be stopped and will quicken or retard or arrest the motion of the indicator and cut-out disk $e$, hereinafter described. The ampere-meter which we prefer to use for this purpose consists of a coil or coils D (see Figs. 1 and $1^b$) in the electric circuit of the current to be measured, which, according to amount of current passing through the said coil or coils, attracts more or less a core or cores D′, fixed on the lower end of the lever or arm $d^3$, pivoted at $d^\times$, which, when no current passes through the coil or coils D, hangs of its own weight in the position seen at Fig. $1^b$ and props up the lever $b$, as shown, so that the pin or bowl $a^2$ is almost out of reach of the cam $a'$ and the clockwork C is stopped, as only the inoperative part $b''$ of the slot $b'$ can engage with the pin $c'$. Every lamp which is lighted moves the lever or arm $d^3$ a step farther from the fulcrum of the lever $b$ and allows the said bowl $a^2$ to be moved by the weight of the lever $b$ farther into gear with the cam $a'$, which works the slot $b'$ one incline farther as each lamp is lighted and so moves the escapement one tooth more for each lamp; or we may use for the above purpose a length of suitable wire $d$, forming a resistance in the circuit of the current to be measured, as seen on Fig. $1^\times$. The stronger this current is the more this wire $d$ will expand in length and allow a second wire or fine cord $d'$ to be bent or "sag," the wire or cord $d'$ being connected to the arm $d^3$, which is shown as a piece of thin spring-steel, by the link $d^2$. (See also Fig. $1^a$.) The arm $d^3$ can then, if it takes the form of a spring, as shown, move farther from the center of the lever $b$ and below a farther step on the cam-surface $b^3$. We prefer, however, the device shown at Figs. 1 and $1^b$.

The governing-lever $b$ may work in any convenient position with regard to the ampere-meter or equivalent device, and, if preferred, the arm $d^3$ may carry the graduated or stepped cam-surface, as shown at $d^{30}$, Fig. 12, and the arm or projection $b^{50}$ may be formed or fitted on the governing-lever $b$. It will therefore be evident that owing to this cam-surface $b^3$ (or $d^{30}$) it will not be necessary to calibrate the ampere-meter, as the said surface $b^3$ can be formed to agree exactly with the motion of the ampere-meter which is applied in each case.

The auxiliary clockwork C, the speed of motion or stoppage of which is thus regulated by the amount of current-supply or the stoppage of the same, actuates a disk or wheel $e$, which is actuated by friction on its shaft or arbor $e'$, so that it can be set like the hands of a clock, and this disk or wheel $e$ on the shaft $e'$ is preferably provided with a projection $e^\times$, coming in contact with the long switch-lever $e^2$. (See also detached Figs. $2^a$, 3, and 4.) The said switch-lever, being displaced by the projection $e^\times$, releases a pin $z$ on a spring-switch $e^3$ from a notch $y$ on the lever $e^2$ and allows the switch $e^3$ to be pulled by its spring $e^5$ out of contact with a spring-plate $f'$ (see Fig. 1) or with two spring-plates $f f'$ (see dotted lines, Fig. 3) in the circuit, and the circuit is thus broken and the current shut off, as hereinafter explained. When, however, the disk $e$ is set in such a position that the end of the cut-out or switch-lever $e^2$ is not in contact with the projection $e^\times$, the said lever $e^2$ is held by the spring $x$ in such a position that the switch $e^3$ is in contact, owing to the pin $z$ and notch $y$, with the spring-plate $f'$ or plates $f f'$, (see full lines, Fig. 3,) and the electric circuit is completed, as hereinafter explained, to supply the desired current. A second spring-switch $e^4$ is provided having a slotted depending link $e^6$ and bearing upward against a flattened disk $e^{\times\times}$, also shown detached at Fig. 9 on the shaft $g^2$, hereinafter described. When raised, this lever $e^4$ is in contact with a spring-plate $f^3$ (see Fig. 1) or two spring-plates $f^2 f^3$, in which case the plates $f$ and $f^2$ are connected together by a wire and the plates $f'$ and $f^3$ are connected to wires in the electric circuit of the current supplied. Thus when either $e^3$ or $e^4$ is out of contact with its spring-plates the circuit is broken, as hereinafter explained. $e^3$ is set in contact with its plate $f'$ or plates $f f'$ by depressing the switch $e^4$ by turning the disk $e^{\times\times}$, as hereinafter described, (see Fig. 4,) and owing to the slotted link $e^6$ the switch $e^4$ can rise again, leaving the switch $e^3$ depressed and locked by the catch $y\ z$. The levers $e^3\ e^4$ are preferably provided with insulated metallic contact-plates $e^{31}\ e^{41}$, in metallic connection with which in case of two plates $f''\ f^3$ only being used the link $e^6$ is fitted. It will be understood that when the four plates $f f'$ $f^2 f^3$ are used, Figs. $1^{\times}$, 3, and 4, the electric current will when the circuit is complete pass from $f'$ to $f$ along the plate $e^{31}$, (or the lever $e^3$ if $e^{31}$ is not used,) thence along the wire $x'$ to $f^2$, and along the plate $e^{41}$ (or the lever $e^4$ if $e^{41}$ is not used) to the plate $f^3$. The link $e^6$ may be of non-conducting material or insulated from $e^3$ or $e^4$, or both. If $f' f^3$ only are used, Fig. 1, the electric current will when the circuit is complete pass from $f'$ along the plate $e^{31}$, (or the lever $e^3$ if $e^{31}$ is not used,) thence along the link $e^6$ to the plate $e^{41}$ (or $e^4$ if $e^{41}$ is not used) to the plate $f^3$. In all cases the circuit can be broken by the displacement of either lever $e^3$ or $e^4$ and is only complete when both levers $e^3\ e^4$ are in contact with their respective plates $f' f^3$. This disk $e$ may be set back by hand by any authorized person, and the amount of such setback is preferably indicated by a pointer E, rotating in front of a fixed dial E', so that the amount of the current of electricity paid for and unused is clearly and readily ascertained. We prefer, however, to set back the disk $e$ as follows: We provide the periphery with a suitable surface, in contact with which a friction-sector $g$ (shown also detached at Fig. 8) can act. This sector is rotated by a suitable handle $g'$ and shaft $g^2$, (see also Fig. 7,) which, however, are prevented by a ratchet-wheel $g^3$ (see also Fig. 10) and fixed catch $g^4$ from rotating backward, and if the meter is to be freed by a coin or the like are held by a suitable cam $g^5$ (see also Fig. 11) from rotating forward. In such case this cam $g^5$ rests against the end of a lever $g^6$, (see Figs. 5 and 6,) which, however, is withdrawn by the weight of a coin dropped into the apparatus through a convenient aperture at $h$, Fig. 1. The coin passes down the chute $h'$ and comes in contact with the end of the lever $g^6$, which it displaces. The cam $g^5$ being then released, the handle $g'$ can be turned and the sector $g$ brought into contact with the disk $e$, which it will rotate and set back until it has passed out of contact therewith.

We prefer to make the sector $g$ in two parts, Fig. 8, held together by a set-screw $g^{\times}$ and slot, and so that the length of arc or friction-surface can be increased or reduced according to the price to be charged for the electricity.

$g^{\times\times}$ is a screw for adjusting the setting with greater accuracy.

When the current commences, the main clockwork A will, through the auxiliary clockwork C, gradually return the disk $e$ to its original position, and the cut-out lever $e^2$ will then be tripped by the projection $e^{\times}$, which allows the lever $e^3$ to be lifted from the spring-plate $f'$ or plates $f f'$ by the spring $e^5$, and the current-supply will be shut off.

If desired, one of the auxiliary clockwork-wheels may be provided with or otherwise actuate an indicating-dial C', Fig. 1, or pointer to show the exact amount of current used independently of the coins found in the receiver.

An indicator, such as C', will allow the meter to be used without prepayment if the lever $g^6$ is removed.

We propose also to provide the clockwork A with a device which when the key of the clock A is inserted into the keyhole $w$ will cause the electric circuit to be broken, and the current-supply will cease until the key is removed, and thus the clock cannot be kept stopped by the key while the current is being supplied. For this purpose we may provide the long cut-out lever $e^3$ with a cranked arm $e^{21}$, (see Figs. 1 and $2^b$,) having a part $e^{22}$ projecting over the winding-square $k^{\times}$, so that before the key can be fitted on the square it must raise the part $e^{22}$ and displace the switch-lever $e^2$, so that the pin $z$ on the switch $e^3$ is released and the current cut off; or we make the outer end of the winding-spindle $k$ smaller in diameter than the "square," the barrel of the key being of course sufficiently long to reach the square $k^{\times}$, and embracing this reduced part we mount the lever $k'$, preferably forked or slotted, as shown on Figs. $1^{\times}$ and $2^{\times}$, which when pushed in by the key on its way to the square is moved, thereby acting on a wedge-piece $k^2$, (see also Fig. $4^a$,) which displaces the cut-out lever $e^2$ and stops the current-supply, as above described.

We further arrange a spring-catch $i$ beneath the sweep of the pendulum $A^{\times}$ and at or near the end of the stroke of the said pendulum, (see Fig. 1,) this catch $i$ being held down when the current is on by a cranked arm $e^{51}$, fixed to the switch $e^3$; but as soon as the switch $e^3$ is raised the arm $e^{51}$ moves nearer the fixed end of the catch $i$ and allows it to rise and catch the pendulum $A^{\times}$ when it next passes its end and so stop the clockwork A until the switch $e^3$ is replaced in contact with its plate $f'$ or plates $f f'$; or a suitable spring-catch $i$ on a spring-lever $i'$, (see Fig. $1^{\times}$,) acted on by an electric magnet $i^3$ in the circuit of the electric current supplied, is so arranged that when the supply is stopped the pendulum $A^{\times}$ will be caught by $i$ and arrested until the lever $i'$ is withdrawn again by the current, and then the pendulum will begin to swing again. The necessary movement for completing the circuit again to withdraw the lever $i'$ is provided for by cutting away a few of the teeth of the wheel $g^3$, as seen at Fig. 10 detached. This wheel $g^3$ can therefore be moved by the handle $g'$ before the sector $g$ comes in contact with the disk $e$ for a distance sufficient to partly turn the flattened disk $e^{\times\times}$ and depress the switch $e^4$, and with it the switch $e^3$, (see Fig. 4), the said switch $e^4$ being suitably connected to $e^3$—say by the pin $e^7$ and slotted link $e^6$—and when the handle $g'$ is returned, as it must be, the switch $e^4$ will rise again, leaving the lever $e^3$ depressed and locked, as seen at Figs. 1 and 3, and the circuit will thus be completed.

The electric circuit may be caused also to be broken by the running down of the clock, by the expansion of the mainspring $m$ and its consequent contact with the set-pin $e^3$, and displacement of the cut-out lever $e^2$.

Further, should it be attempted to use more than the six or other proper number of lights by the current passing through this meter the coil or coils D will attract the prop or arm $d^3$ to such an extent that the part $b^3$ will miss it altogether, and the lever $b$ can move still farther toward the center of the cam $e'$, and an arm $b^{13}$ thereon will come in contact with a small weighted catch $n$, pivoted at $n'$ to the end of the cranked part $e^{21}$ of the switch-lever $e^2$ and throw it into gear with the teeth of one of the wheels—say $A^2$ of the clockwork A. This wheel $A^2$ will in its motion raise the catch $n$ and the crank $e^{21}$ and so move $e^2$ to release the switch $e^3$ and break the circuit, as before explained. We propose to provide a short inoperative part $b^{12}$ at the inner end of the slot $b'$ (or its equivalent) to allow of this slight extra motion of the lever $b$ without working the escapement $c^2$ $c^3$. An arm or projection $n^2$ on the lever $e^4$ moves the catch $n$ out of the teeth of the wheel $A^2$ when the lever $e^4$ is depressed by the flattened disk to complete the circuit again.

The action of the apparatus is as follows: A coin is inserted in the opening $h$ and rolls down the chute $h'$ and comes in contact with the upright end of the lever $g^6$ and by its weight moves $g^6$, so that the handle $g'$ can turn the cam $g^5$, which forces the lever $g^6$ still farther outward (see Fig. 5) and allows the coin to drop from the chute $h'$ into any convenient receptacle. (Not shown on the drawings.) The coin is caused to fall clear of the switches by the inclined plate $h^2$. The cam $g$ by the further motion of the handle $g'$ acts upon the wheel $e$ and causes it to make part of a revolution, the cam $e^{\times\times}$ having at the same time forced the lever $e^4$ to push down the lever $e^3$ (see Fig. 3) from the dotted position shown on that figure into the position shown also at Figs. 1 and $1^\times$. The complete rotation of the handle $g'$ brings the flat part of $e^{\times\times}$ into contact with $e^4$, which can rise again, owing to the slot in the link $e^6$, and thus the circuit in which the spring-plates $f'$ $f^3$ or $f f' f^2 f^3$ are fitted is completed. Figs. 1 and $1^\times$ show the arm or prop $d^3$ in full lines in such a position that all the lights are in use, and the cam $b^3$ has allowed the lever $b$ to assume the position seen at Figs. 1 and $1^\times$, having the pin $a^2$ acted on by almost the entire working surface of the arms of the cam $a'$, which, being constantly rotated by the clockwork A, (which has been set going by the release of the pendulum $A^\times$ on the completion of the circuit,) will cause the whole of the cam $b'$ to act on the escapement $c^2$, giving it six motions, and thus the clockwork C will return the arm $e^\times$ quickly toward the lever $e^2$, because all the lamps are alight. Should one lamp or more be turned out, the arm or prop $d^3$ will be moved nearer to the dotted position and so allow fewer motions to be given to the escapement $c^2$ of the clockwork C, and the arm $e^\times$ will move back more slowly. When all the electricity paid for has been used, the arm $e^\times$ comes in contact with $e^2$ and pushes it back to release the pin $z$ and allow the spring $e^5$ to raise the lever $e^3$ and break the connection between $f'$ and $f^3$. The current then ceases, the prop or arm $d^3$ moves back and keeps the pin $a^2$ almost entirely out of gear with the cam $a'$, so that the clockwork C is stopped, and the pendulum $A^\times$ is also stopped, as above described.

We would remark, in conclusion, that the form of primary and auxiliary clockworks can be varied (as will be readily understood) without departing from the principle of our invention.

We claim as our invention—

1. Mechanism for supplying and measuring electricity, consisting of primary clockwork, auxiliary clockwork, a governing-lever actuated by said primary clockwork and controlling the escapement of the auxiliary clockwork, in combination with a cut-out device actuated by the auxiliary clockwork and a device (controlled by the strength of the current used) whereby the governing-lever remains inactive when no current is being used and allows the aforesaid escapement to work quickly or slowly according as a greater or less amount of current is being used.

2. Mechanism for supplying and measuring electricity consisting of primary clockwork, auxiliary clockwork, a governing-lever actuated by said primary clockwork and controlling the escapement of the auxiliary clockwork, in combination with a cut-out device and an indicator actuated by the auxiliary clockwork and a device controlled by the strength of the current used, whereby the governing-lever remains inactive when no current is being used, and allows the aforesaid escapement to work quickly or slowly according as a greater or less amount of current is being used.

3. The combination of a primary clockwork and an ampere-meter, with a governing-lever controlled by the said ampere-meter, the said primary clockwork adapted to actuate the said lever subject to the control thereof by the ampere-meter, and a secondary clockwork controlled by the said lever.

4. The combination of a primary clockwork, a cam actuated thereby, and an ampere-meter, with an auxiliary clockwork, a lever governing the same, the said lever adapted to engage with more or less of the surface of said cam according to the control of the said ampere-meter, substantially as and for the purposes set forth.

5. The combination of the clockwork A and C and their adjuncts with the setting-disk $e$, arbor $e'$, projection $e^\times$, handle $g'$, sector $g$ and shaft $g^2$.

6. The combination of the clockwork A and C and their adjuncts with an electric switch, the setting-disk $e$ projection $e^\times$, arbor $e'$ and lever $e^2$ for tripping the electric switch to shut off the current.

7. The combination of the clockwork A and C and their adjuncts, with the setting-lever $e^2$, plates $f'$, $f^3$, and switch-levers $e^3$, $e^4$ linked together and connecting the plates $f'$ $f^3$ to complete the electric circuit.

8. The combination of the clockwork A and C and their adjuncts, with mechanism for cutting off the current-supply and means actuated by the key of the clockwork A when applied thereto for working the cut-out, substantially as hereinbefore described.

9. The combination of the clockwork A and C and their adjuncts, with mechanism for cutting off the current-supply and means for simultaneously stopping the clockwork A, substantially as hereinbefore described.

10. The combination of a primary clockwork, an ampere-meter, and a governing-lever controlled by the ampere-meter and actuated by the primary clockwork subject to the control of the said ampere-meter, the said lever being provided with a cam, with an auxiliary clockwork, the escapement-lever of which is adapted to engage with and be operated by more or less of the said cam according to the control of the said ampere-meter over the said lever, substantially as and for the purposes set forth.

In testimony whereof we have signed our names to this specification in the presence of two subscribing witnesses.

WILLIAM D. WATSON.
THOMAS HUMPHREYS.

Witnesses:
 CHARLES A. DAVIES,
 JNO. HUGHES.